United States Patent
Lin et al.

(10) Patent No.: US 8,152,319 B2
(45) Date of Patent: Apr. 10, 2012

(54) BACKLIGHT MODULE AND LIQUID CRYSTAL DISPLAY

(75) Inventors: Chun-Liang Lin, Hsin-Chu (TW); Ya-Ling Hsu, Hsin-Chu (TW); Ying-Li Wang, Hsin-Chu (TW); Chun-Chieh Wang, Hsin-Chu (TW); Chen-Hsien Liao, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 308 days.

(21) Appl. No.: 12/474,423

(22) Filed: May 29, 2009

(65) Prior Publication Data

US 2010/0182532 A1    Jul. 22, 2010

(30) Foreign Application Priority Data

Jan. 20, 2009    (TW) .............................. 98102047 A

(51) Int. Cl.
*G09F 13/04*    (2006.01)
*G09F 13/08*    (2006.01)
(52) U.S. Cl. ..................... 362/97.2; 362/97.1; 362/600
(58) Field of Classification Search .................. 362/609, 362/612, 613, 614, 561, 236, 241, 97.1, 97.2, 362/97.3, 19, 84
See application file for complete search history.

(56) References Cited

U.S. PATENT DOCUMENTS

| | | | |
|---|---|---|---|
| 5,267,029 A * | 11/1993 | Kurematsu et al. | 348/751 |
| 5,359,691 A * | 10/1994 | Tai et al. | 385/146 |
| 6,653,765 B1 | 11/2003 | Levinson et al. | |
| 6,657,379 B2 | 12/2003 | Ellens et al. | |
| 6,871,982 B2 | 3/2005 | Holman et al. | |
| 7,074,463 B2 * | 7/2006 | Jones et al. | 428/1.1 |
| 2004/0104391 A1 * | 6/2004 | Maeda et al. | 257/79 |
| 2005/0041291 A1 * | 2/2005 | Muraguchi et al. | 359/498 |
| 2006/0067073 A1 * | 3/2006 | Ting | 362/231 |
| 2006/0082296 A1 * | 4/2006 | Chua et al. | 313/512 |
| 2006/0152931 A1 | 7/2006 | Holman | |
| 2006/0291238 A1 * | 12/2006 | Epstein et al. | 362/600 |
| 2007/0123135 A1 * | 5/2007 | Yang et al. | 445/24 |

FOREIGN PATENT DOCUMENTS

TW    I261378    9/2006

OTHER PUBLICATIONS

English language translation of abstract of I261378.

* cited by examiner

*Primary Examiner* — Anabel Ton
*Assistant Examiner* — Danielle Allen
(74) *Attorney, Agent, or Firm* — Thomas, Kayden, Horstemeyer & Risley, LLP

(57) ABSTRACT

A backlight module and a liquid crystal display are disclosed. In the backlight module having a reflector base, a phosphor layer is disposed on the reflector base, and a plurality of blue light emitting diode (LEDs) are disposed above the reflector base and the phosphor layer for emitting a first light beam. An optical film is disposed above the reflector base, the phosphor layer and the blue LEDs for allowing P-polarized light of the first light beam to pass therethrough and reflecting S-polarized light of the first light beam to the phosphor layer so as to excite the phosphor layer to generate a second light beam of which the wavelengths are different from those of the first light beam. After being reflected to the optical film by the reflector base, the second light beam transmits through the optical film, and mixes with the first light beam to generate white light.

26 Claims, 10 Drawing Sheets

BACKLIGHT MODULE AND LIQUID CRYSTAL DISPLAY

RELATED APPLICATIONS

This application claims priority to Taiwan Application Serial Number 98102047, filed Jan. 20, 2009, which is herein incorporated by reference.

BACKGROUND

1. Field of Invention

The present invention relates to a backlight module and a liquid crystal display (LCD). More particularly, the present invention relates to a backlight module and a liquid crystal display which can promote photon utilization.

2. Description of Related Art

An LCD is one of the most widely-used display technologies nowadays. The components forming the LCD include many optical components, such as a polarizer and a color filter, etc. In general, the polarizer would cause a loss of 50% of the incident light, and the color filter would cause another loss of 60% of the remaining incident light. Hence, after light transmits through these components, only 20% of the light remains, thus results in lightness loss of a backlight module or an LCD.

Due to rising environment awareness, a white light emitting diode (LED) having the advantages of small size, high luminance and no mercury has been increasingly applied on a backlight module of an LCD. The white LED is formed by using a blue LED chip with an encapsulant containing green and red phosphors, wherein the encapsulant encapsulates the blue LED chip in a reflector base. When the blue LED chip emits blue light, the blue light will excite the green and red phosphors contained in the encapsulant to generate red light and green light, wherein a portion of the red light and the green light will be directly reflected to the blue LED chip or will be reflected first to the reflector base and then to the blue LED chip and finally absorbed by the blue LED chip; and the other portion of the red light and the green light will transmit through the polarizer together with the blue light transmitting through the encapsulant, and thus the red, green and blue light is mixed to form white light. Just as described above, the polarizer will consume 50% of the incident light. As shown in Table 1, let say 100 blue photons are initially emitted by the blue LED chip. After the photons transmit though the green and red phosphors, only 50 blue phonons remain, but 40 red or green photons are generated by exciting the green and red phosphors, and thus 10 blue photons are consumed or absorbed. Then, after the photons transmit through the polarizer, only 25 blue photons and 20 red or green photon left. Hence, while a white LED is applied on a conventional backlight module or a conventional LCD, the utilization ratio of the photons transmitting through the polarizer from the white LED is only about 45%.

TABLE 1

| number of photons | blue | red or green |
| --- | --- | --- |
| initial | 100 | N/A |
| after phosphors | 50 | 40 |
| after polarizer | 25 | 20 |

SUMMARY

In view of the problem of low photon utilization existing in the conventional backlight module or LED using a white LED as a backlight source, the present invention therefore provides a backlight module and an LCD to increase the photon utilization of backlight source, thereby promoting the entire lightness of the LCD.

In accordance with an embodiment of the present invention, the backlight module comprises a reflector base, a phosphor layer, a plurality of LED components and an optical film. The phosphor layer is disposed on the reflector base, and the LED components are disposed above the reflector base and the phosphor layer for emitting a first light beam, and each of the LED components comprises a blue LED. The optical film is disposed above the reflector base, the phosphor layer and the LED components for allowing P-polarized light of the first light beam to pass through the optical film and reflecting S-polarized light of the first light beam to the phosphor layer, thereby exciting the phosphor layer to generate a second light beam, wherein the second light beam have different wavelengths from the first light beam. After being reflected to the optical film, the second light beam may transmit through the optical film so as to mix with the P-polarized light of the first light beam to generate white light.

According to another embodiment of the present invention, the first light beam comprises light with wavelengths ranging from about 420 nm to about 500 nm, and the optical film has a reflectivity of S-polarized light in a range of about 80% to about 99%, and a transmittance of P-polarized light in a range of about 60% to about 99%

According to another embodiment of the present invention, the phosphor layer is a yellow phosphor layer, and the S-polarized light has wavelengths ranging from 420 nm to 500 nm.

According to another embodiment of the present invention, each of the LED components further comprises a green LED, and the phosphor layer is a red phosphor layer.

According to another embodiment of the present invention, each of the LED components further comprises green phosphor, and the phosphor layer is a red phosphor layer.

According to another embodiment of the present invention, the phosphor layer comprises a red phosphor material and a green phosphor material.

According to another embodiment of the present invention, the optical film comprises a substrate, a microprism structure and an optical material layer. The substrate has a first surface facing towards the reflector base, and a second surface opposite to the first surface. The microprism structure is disposed on the first surface, and the optical material layer is formed on the second surface. The optical material layer is formed by alternately stacking at least one first dielectric layer and at least one second dielectric layer, and the first dielectric layer has a refractive index greater than the refractive index of the second dielectric layer.

According to another embodiment of the present invention, the optical film comprises a substrate and an optical material layer. The optical material layer is formed on a surface of the substrate facing towards the reflector base, wherein the optical material layer is formed by alternately stacking at least one first material layer and at least one second material layer, and the first material layer is formed from 2,6-polyethylene naphthalate (PEN), and the second material layer is formed from co-PEN.

According to another embodiment of the present invention, the LCD comprises the aforementioned backlight module, a polarizer and liquid crystal panel. The polarizer is disposed on a light emitting direction of the backlight module, and the liquid crystal panel is disposed above the polarizer.

With the application of the aforementioned backlight module and the LCD, the photon utilization of backlight source can be effectively increased, thus greatly promoting the entire lightness of the LCD.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1A:
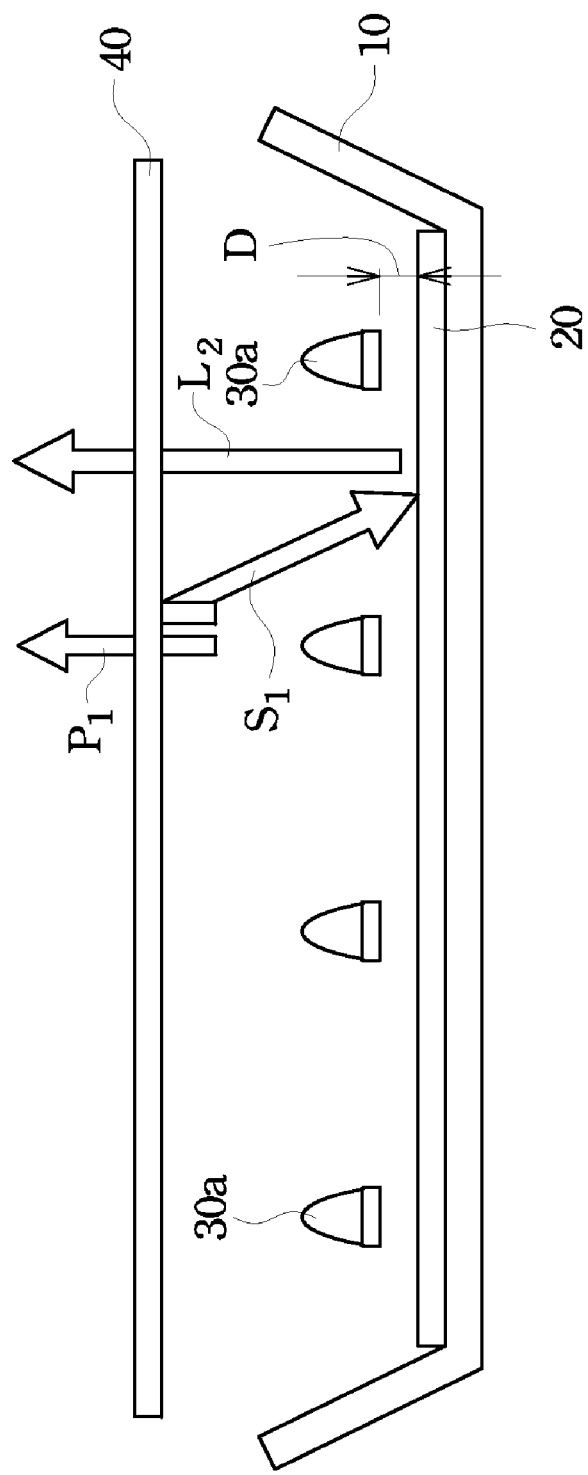
FIG. 1A is a schematic diagram showing the structure of a backlight module according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In the design of a backlight module of the present invention, an optical film (such as a double brightness enhancement film (DBEF)) which can reflect S-polarized light with blue spectrum is disposed above LED packages comprising blue light emitting diodes (LEDs), so as to totally or partially reflect S-polarized light of the blue light emitted from the LED packages, and then the reflected light is used to excite the phosphors disposed on a reflector base to generate red light and/or green light, and then the red light and/or the green light are mixed with the blue light transmitting through the optical film to form white light.

Hereinafter, several backlight modules are explained as examples, but the present invention is not limited thereto.

EXAMPLE 1

Referring to FIG. 1A, FIG. 1A is a schematic diagram showing the structure of a backlight module according to a first embodiment of the present invention. The backlight module of this embodiment comprises a reflector base 10, a red phosphor layer 20, a plurality of LED packages 30a and an optical film 40.

Figure 6A:
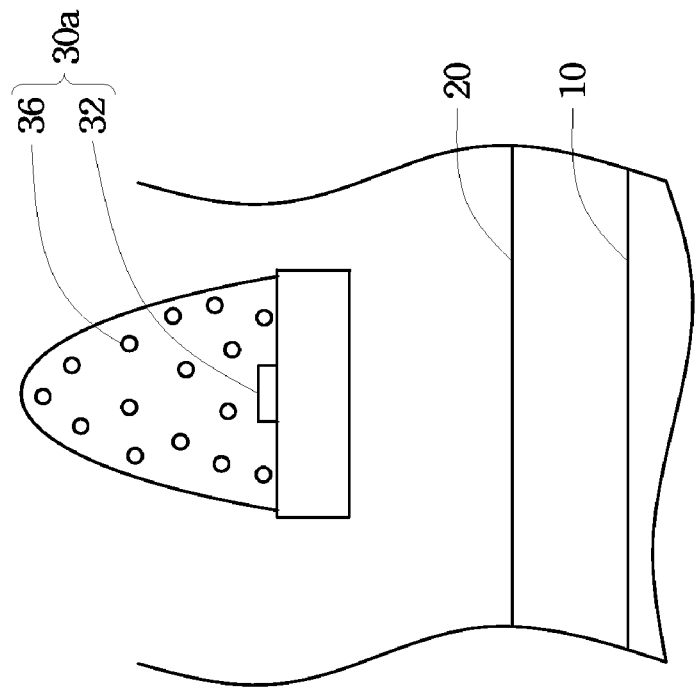
FIG. 6A is a schematic enlarged diagram showing the structure of the LED packages according to the first embodiment of the present invention.
Figure 6B:
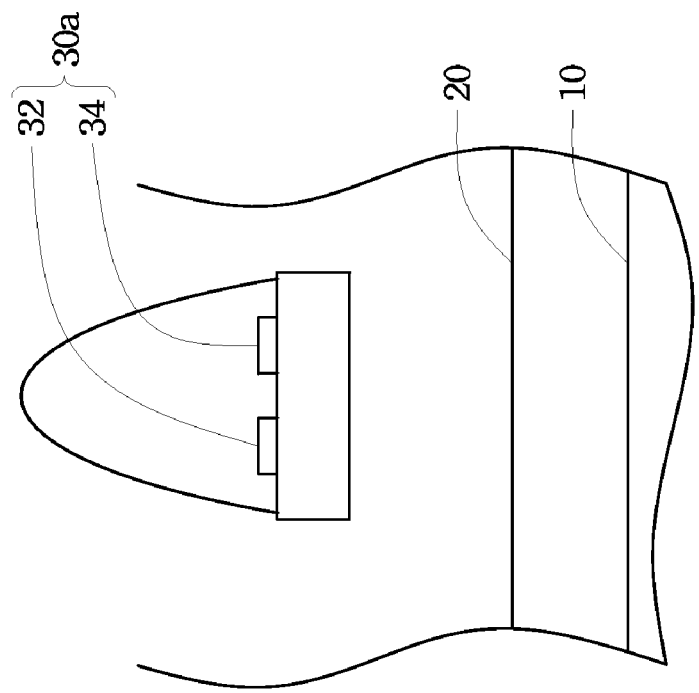
FIG. 6B is a schematic enlarged diagram showing the structure of the LED packages according to the first embodiment of the present invention.

The red phosphor layer 20 is disposed on an upper surface and/or a side surface of the reflector 10. The LED packages 30a are disposed above the reflector base 10 and the red phosphor layer 20, and generate a first light beam $P_1+S_1$, wherein each of the LED packages 30a is composed of a blue LED 32 and a green LED 34 (shown in FIG. 6A); or a blue LED 32 and a green phosphor 36 (shown in FIG. 6B), thereby generating blue light and green light. The first light beam $P_1+S_1$ has wavelengths ranging from about 420 nm to about 580 nm. The optical film 40 is disposed above the reflector base 10, the red phosphor layer 20 and the LED packages 30a.

The LED packages 30a are spaced from the red phosphor layer 20 at a distance D, and the distance D ranges from about 0.01 mm to about 3 mm, so that the red phosphor layer 20 may effectively absorb the S-polarized light $S_1$ of the first light beam $P_1+S_1$ reflected by the optical film 40, and may even absorb a small portion of the P-polarized light $P_1$ of the first light beam $P_1+S_1$ which fails to transmit through the optical film 40.

Figure 1B:
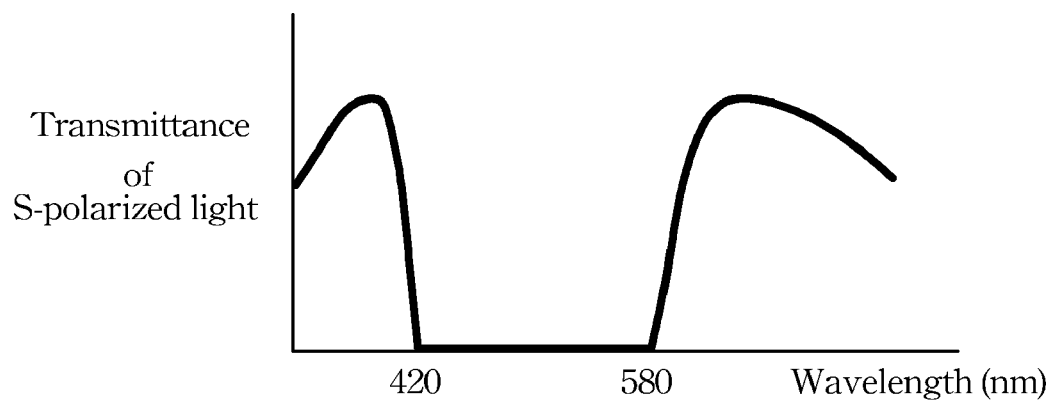
FIG. 1B and FIG. 1C are schematic diagrams showing the properties of an optical film according to the first embodiment of the present invention.
Figure 1C:
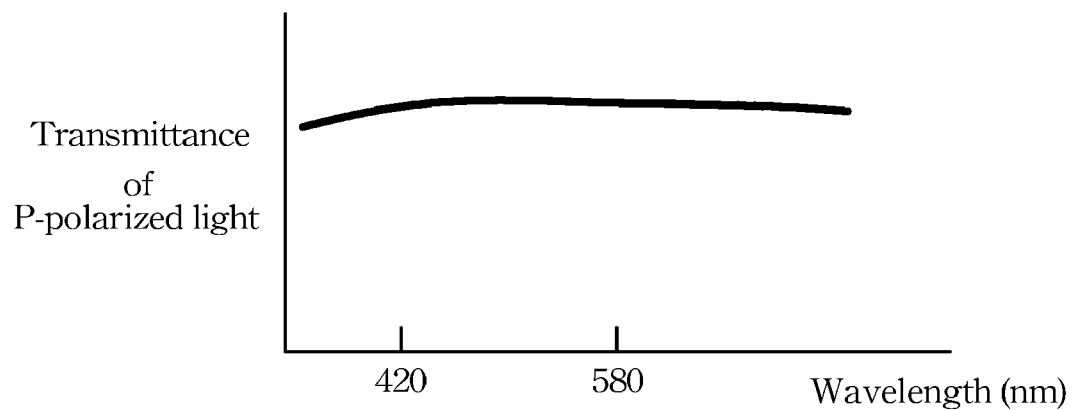

Referring to FIG. 1B and FIG. 1C, FIG. 1B and FIG. 1C are schematic diagrams showing the properties of the optical film 40 according to the first embodiment of the present invention. Such as shown in FIG. 1B, the horizontal axis represents a wavelength of the S-polarized light emitted by the LED packages 30a in nanometer (nm), and the vertical axis represents the transmittance of the S-polarized light in a dimensionless relative unit. The optical film 40 can reflect the S-polarized light $S_1$ in a range of 420 nm to 580 nm, and allow the S-polarized light of the remaining wavelengths to pass therethrough. Such as shown in FIG. 1C, the horizontal axis represents a wavelength of the P-polarized light emitted by the LED packages 30a in nanometer (nm), and the vertical axis represents the transmittance of the P-polarized light in a dimensionless relative unit. The optical film 40 can allow the P-polarized light of almost all the wavelengths to pass therethrough. With respect to the first light beam $P_1+S_1$ in a range of 420 nm to 580 nm, the optical film 40 has a reflectivity of S-polarized light $S_1$ in a range of about 80% to about 99%, and a transmittance of P-polarized light $P_1$ in a range of about 60% to about 99%.

Hence, as shown in FIG. 1A, the optical film 40 can allow a portion or all of the P-polarized light beam $P_1$ to pass therethrough, and reflect a portion or all of the S-polarized light $S_1$ to the red phosphor layer 20, so as to excite the red phosphor layer 20 to generate a second (red) light beams $L_2$, wherein the second (red) light beam $L_2$ have different wavelengths from the first (blue and green) light beam $P_1+S_1$. A portion of the second (red) light beam $L_2$ is emitted to the optical film 40 from the red phosphor layer 20, and another portion of the second (red) light beam $L_2$ is first emitted to the reflector base 10 and then reflected to the optical film 40 by the reflector base 10. Thereafter, the second (red) light beams $L_2$ may transmit through the optical film 40 and mix with the P-polarized light $P_1$ of the first (blue and green) light beam to generate white light.

EXAMPLE 2

Figure 2A:
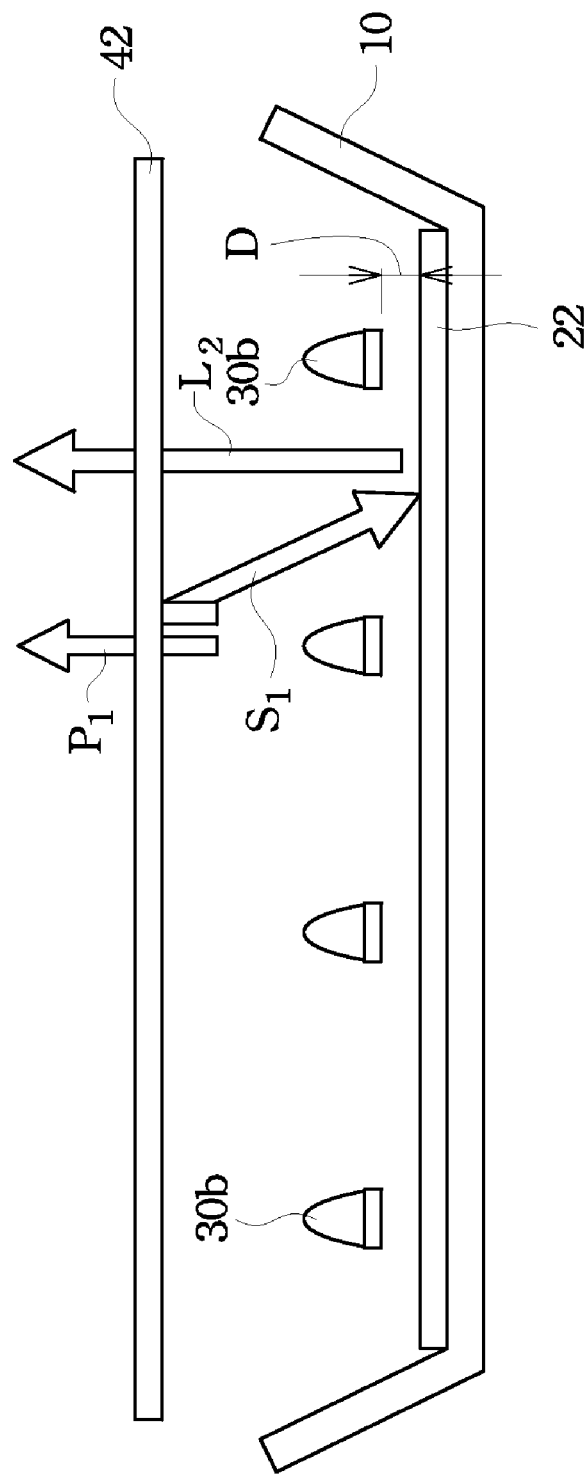
FIG. 2A is a schematic diagram showing the structure of a backlight module according to a second embodiment of the present invention.

Referring to FIG. 2A, FIG. 2A is a schematic diagram showing the structure of a backlight module according to a second embodiment of the present invention. The backlight module of this embodiment comprises a reflector base 10, a phosphor layer 22 comprising a red phosphor material and a green phosphor material, a plurality of LED packages 30b and an optical film 42.

The phosphor layer 22 is disposed on an upper surface and/or a side surface of the reflector 10. The LED packages 30b are disposed above the reflector base 10 and the phosphor layer 22, and generate a first light beam $P_1+S_1$, wherein each of the LED packages 30b is only composed of a blue LED. The first light beam $P_1+S_1$ has wavelengths ranging from about 420 nm to about 500 nm. The optical film 42 is disposed above the reflector base 10, the phosphor layer 22 and the LED packages 30b. The LED packages 30b are spaced from the phosphor layer 22 at a distance D, and the distance D ranges from about 0.01 mm to about 3 mm, so that the phosphor layer 22 may effectively absorb the S-polarized light $S_1$ of the first light beam $P_1+S_1$ reflected by the optical film 42, and may even absorb a small portion of the P-polarized light $P_1$ of the first light beam $P_1+S_1$ which fails to transmit through the optical film 42.

Figure 2B:
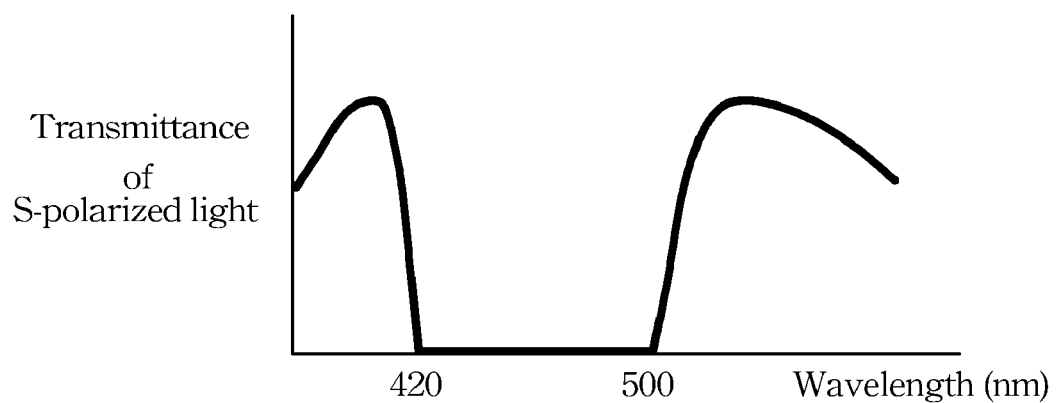
FIG. 2B and FIG. 2C are schematic diagrams showing the properties of an optical film according to the second embodiment of the present invention.
Figure 2C:
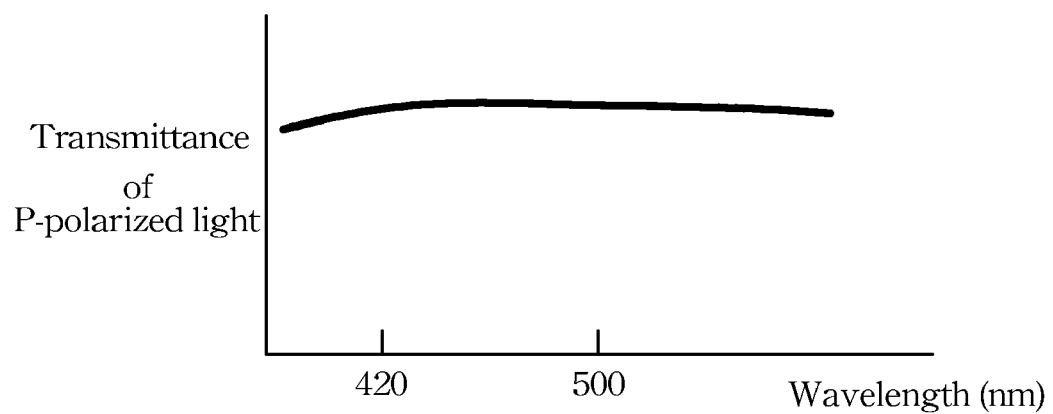

Referring to FIG. 2B and FIG. 2C, FIG. 2B and FIG. 2C are schematic diagrams showing the properties of the optical film 42 according to the second embodiment of the present invention. Such as shown in FIG. 2B, the horizontal axis represents a wavelength of the S-polarized light emitted by the LED packages 30b in nanometer (nm), and the vertical axis represents the transmittance of the S-polarized light in a dimensionless relative unit. The optical film 42 can reflect the S-polarized light $S_1$ in a range of 420 nm to 500 nm, and allow the S-polarized light of the remaining wavelengths to pass therethrough. Such as shown in FIG. 2C, the horizontal axis represents a wavelength of the P-polarized light emitted by the LED packages 30b in nanometer (nm), and the vertical axis represents the transmittance of the P-polarized light in a dimensionless relative unit. The optical film 42 can allow the P-polarized light of almost all the wavelengths to pass therethrough. With respect to the first light beam $P_1+S_1$ in a range of 420 nm to 500 nm, the optical film 42 has a reflectivity of S-polarized light $S_1$ in a range of about 80% to about 99%, and a transmittance of P-polarized light $P_1$ in a range of about 60% to about 99%.

Hence, as shown in FIG. 2A, the optical film 42 can allow a portion or all of the P-polarized light beam $P_1$ to pass therethrough, and reflect a portion or all of the S-polarized light $S_1$ to the phosphor layer 22, so as to excite the phosphor layer 22 (red and green phosphors) to generate a second (red and green) light beams $L_2$, wherein the second (red and green) light beam $L_2$ have different wavelengths from the first light (blue) beam $P_1+S_1$. A portion of the second (red and green) light beam $L_2$ is emitted to the optical film 42 from the phosphor layer 22, and another portion of the second light beams (red and green) $L_2$ is first emitted to the reflector base 10 and then reflected to the optical film 42 by the reflector base 10. Thereafter, the second light beams (red and green) $L_2$ may transmit through the optical film 42 and mix with the P-polarized light $P_1$ of the first (blue) light beam to generate white light.

EXAMPLE 3

Figure 3:
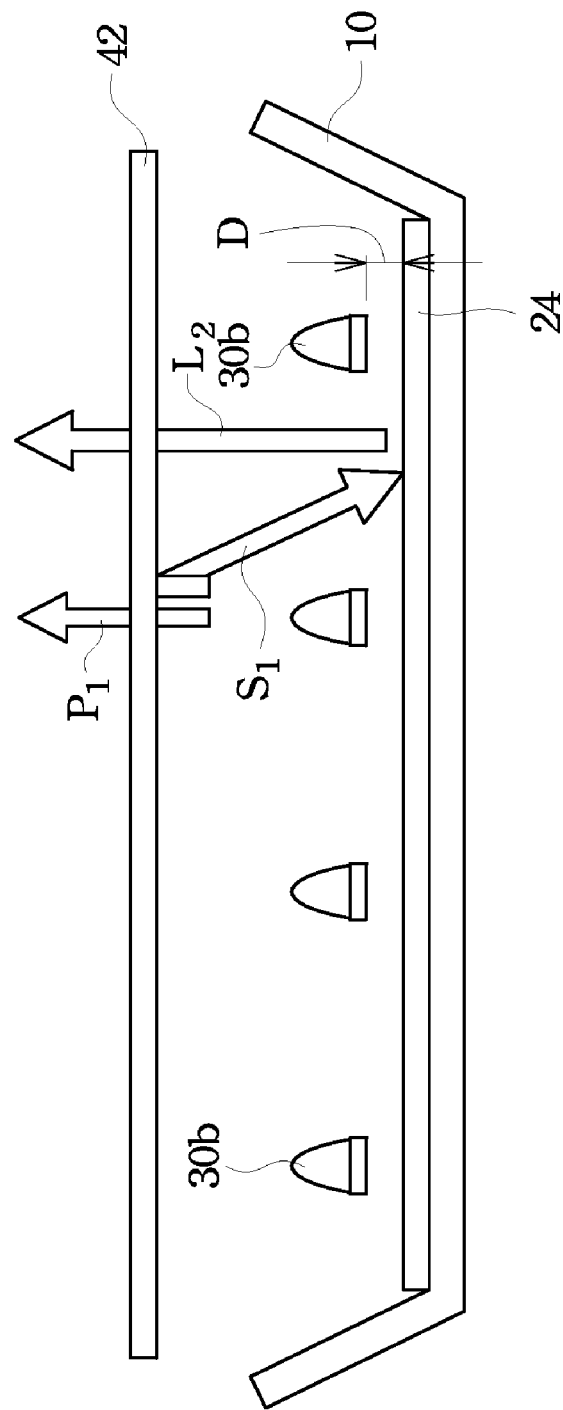
FIG. 3 is a schematic diagram showing the structure of a backlight module according to a third embodiment of the present invention.

Referring to FIG. 3, FIG. 3 is a schematic diagram showing the structure of a backlight module according to a third embodiment of the present invention. In this embodiment, a yellow phosphor layer 24 is used to replace the phosphor layer 22 (red and green phosphors) of the second embodiment, and the S-polarized light $S_1$ reflected by the optical film 42 is also in a range of 420 nm to 500 nm. The arrangements and properties of the other components used in this embodiment are also the same those in the second embodiment, and thus are not described again herein.

The first light (blue) beam $P_1+S_1$ used in the first, second and third embodiments of the present invention all comprises blue light of which the strongest wavelength range is from about 440 nm to about 490 nm.

The following description is stated for explaining several technical methods for adjusting or achieving white balance or white balance specs adopted in various embodiments of the present invention.

First Method

Figure 4A:
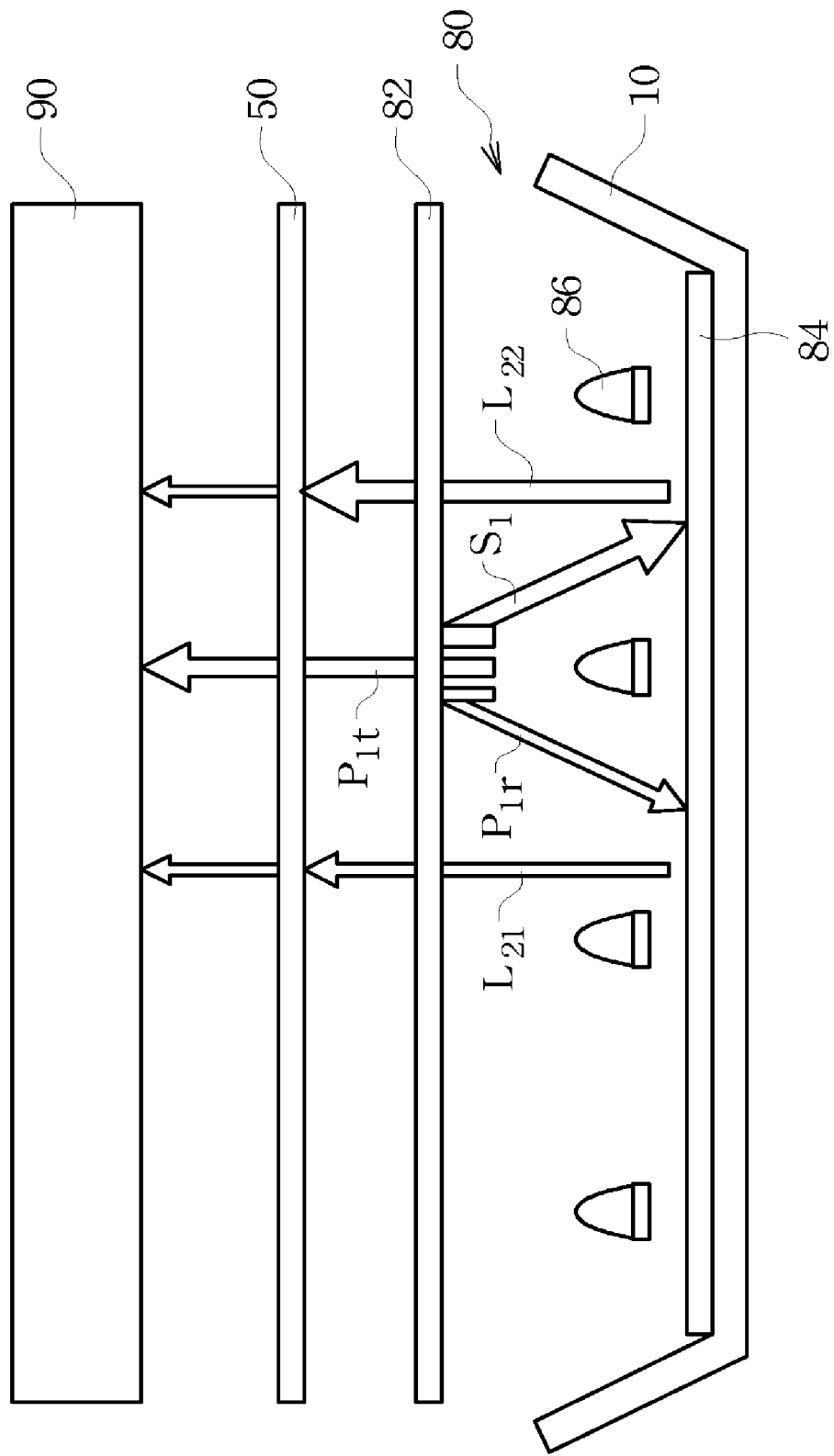
FIG. 4A is a schematic diagram showing the structure of an LCD according to an embodiment of the present invention.

Referring to FIG. 4A, FIG. 4A is a schematic diagram showing the structure of an LCD according to an embodiment of the present invention. The LED of this embodiment comprises a backlight module 80, a polarizer 50 and a liquid crystal panel 90, wherein the phosphor layer 84, the LED packages 86 and the optical film 82 forming the backlight module 80 can be selected from anyone of the first, second and third embodiments described above. The liquid crystal panel 90 is disposed above the polarizer 50, and the polarizer 50 is disposed on a light emitting direction of the backlight module 80. The polarizer 50 can allow most of the transmitting P-polarized light $P_{1t}$ to pass therethrough, wherein the transmitting P-polarized light $P_{1t}$ is a portion of the P-polarized light $P_1$ of the first light beam $P_1+S_1$ transmitting through the optical film 82, and its transmission loss is less than 5%. The polarizer 50 also can allow a portion of the second (red, red and green, or yellow) light beam $L_{21}+L_{22}$ to pass therethrough, and its transmission loss is about 50%, wherein the second light beam $L_{21}$ is generated by using reflected P-polarized light $P_{1r}$ of the P-polarized light $P_1$ to excite the phosphor layer 84, and the reflected P-polarized light $P_{1r}$ is a small amount of P-polarized light $P_1$ of the first light beam $P_1+S_1$ reflected by the optical film 82. The second light beam $L_{22}$ is generated by using S-polarized light $S_1$ to excite the phosphor layer 84, and the S-polarized light $S_1$ is the S-polarized light $S_1$ of the first light beam $P_1+S_1$ reflected by the optical film 82.

In order to achieve white balance of the LCD, the embodiment controls the reflection ratio of the P-polarized light reflected by the optical film 82, i.e. $P_{1r}/(P_{1r}+P_{1t})$, to adjust the intensity of the second light beam $L_{21}+L_{22}$ generated by exciting the phosphor layer 84. For example, if $P_{1r}/(P_{1r}+P_{1t})$ is lower, more transmitting P-polarized light $P_{1t}$ will transmit through the polarizer 50 to the liquid crystal panel 90, and thus the LCD are biased towards the blue and has higher color temperature.

Second method

Figure 4B:
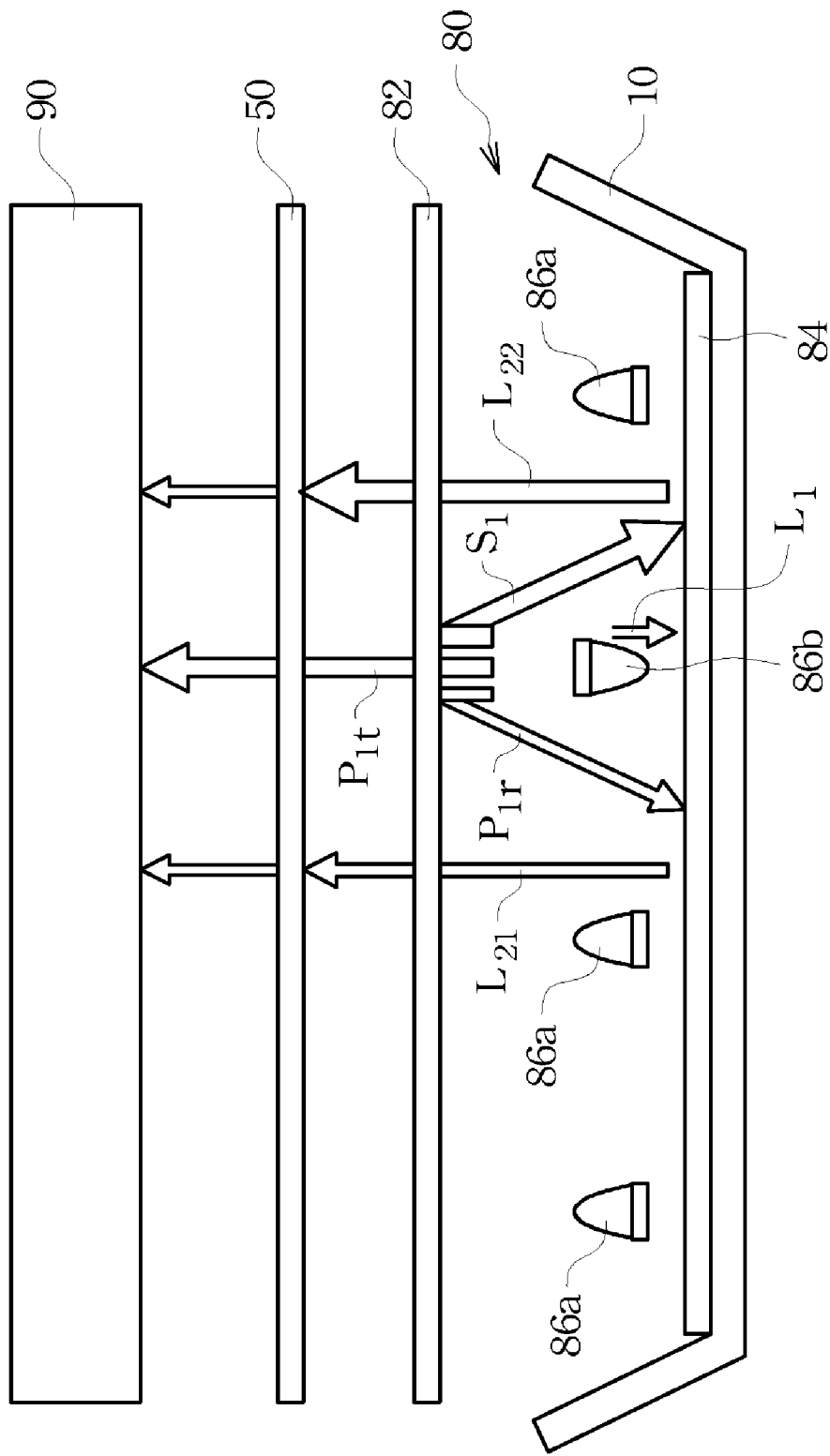
FIG. 4B is a schematic diagram showing the structure of an LCD according to another embodiment of the present invention.

Referring to FIG. 4 B, FIG. 4B is a schematic diagram showing the structure of an LCD according to another embodiment of the present invention. In the first method, all of the LED packages 86 face towards the optical film 82. However, in this embodiment, a portion of the LED packages 86a face towards the optical film 82, and the other portion of the LED packages 86b face towards the phosphor layer 84. In this embodiment, when more LED packages 86b is applied, the first light beam $L_1$ which can directly excite the phosphor layer 84 will be stronger, thus generating stronger second (red, red and green, or yellow) light beam $L_{21}+L_{22}$. Therefore, the present method may achieve the white balance of the LCD by adjusting the ratio of the number of the LED packages 86a to that of the LED packages 86b. In this embodiment, the ratio of the number of the LED packages 86a to that of the LED packages 86b is preferably about 2:1 to 99:1. For example, if the total number of the LED packages 86 is 300, then the number of the LED packages 86b is 100 with the ratio of 2:1; and the number of the LED packages 86b is 3 with the ratio of 99:1, so that the second light beam $L_{21}+L_{22}$ generated by the former ratio (2:1) is stronger, thereby causing the LCD to be biased towards the red or the green and to have lower color temperature.

Hereinafter, the efficacy of the respective embodiments of the present invention is described.

As shown in Table 2, Table 2 shows the results of the first and second embodiments of the present invention which merely reflect the S-polarized light $S_1$ of the first light beam $P_1+S_1$. Let say 100 blue photons are initially emitted by the LED packages 30b. While the photons arrive at the optical film 42, 47 blue phonons transmit through the optical film 42, and 47 blue phonons are reflected by the optical film 42. After the blue photons reflected by the optical film 42 excite the phosphor layer 22 (24), 40 red and green (or yellow) photons are generated in total. When the photons further transmit through the polarizer 50, the number of the blue photons (P-polarized) is slightly reduced to 45, but the total number of the red and green (yellow) is reduced to 20. Hence, with the application of the second and the third embodiments of the present invention, the utilization ratio of the photons transmitting through the polarizer 50 can reach 65%.

TABLE 2

| number of photons | blue | red or green |
| --- | --- | --- |
| initial | 100 | N/A |
| after optical film | 47 transmitting through; 47 reflected | N/A |
| after phosphor layer | 47 | 40 |
| after polarizer | 45 | 20 |

As shown in Table 3, Table 3 shows the results of the first and second embodiments of the present invention which not only reflect the S-polarized light $S_1$ of the first light beam $P_1+S_1$ but also reflect 25% of the P-polarized light $P_1$ of the first light beam $P_1+S_1$ (i.e. applying the first method described above) for adjusting white balance. Let say 100 blue photons are initially emitted by the LED packages 30b. While the photons arrive at the optical film 42, 35 blue phonons transmit through the optical film 42, and 59 blue phonons are reflected by the optical film 42. After the blue photons reflected by the optical film 42 excite the phosphor layer 22 (24), 52 red and green (or yellow) photons are generated in total. When the photons transmit through the polarizer 42, the number of the blue photons (P-polarized) is slightly reduced to 33, but the total number of the red and green (yellow) is reduced to 26. Hence, with the application of the second and the third embodiments of the present invention, the utilization ratio of the photons transmitting through the polarizer 50 can reach 59%.

TABLE 3

| number of photons | blue | red or green |
| --- | --- | --- |
| initial | 100 | N/A |
| after optical film | 35 transmitting through; 59 reflected | N/A |
| after phosphor layer | 35 | 52 |
| after polarizer | 33 | 26 |

Hereinafter, the methods for making the optical film 40 or 42 (82) of the respective embodiments of the present invention are explained.

Figure 5A:
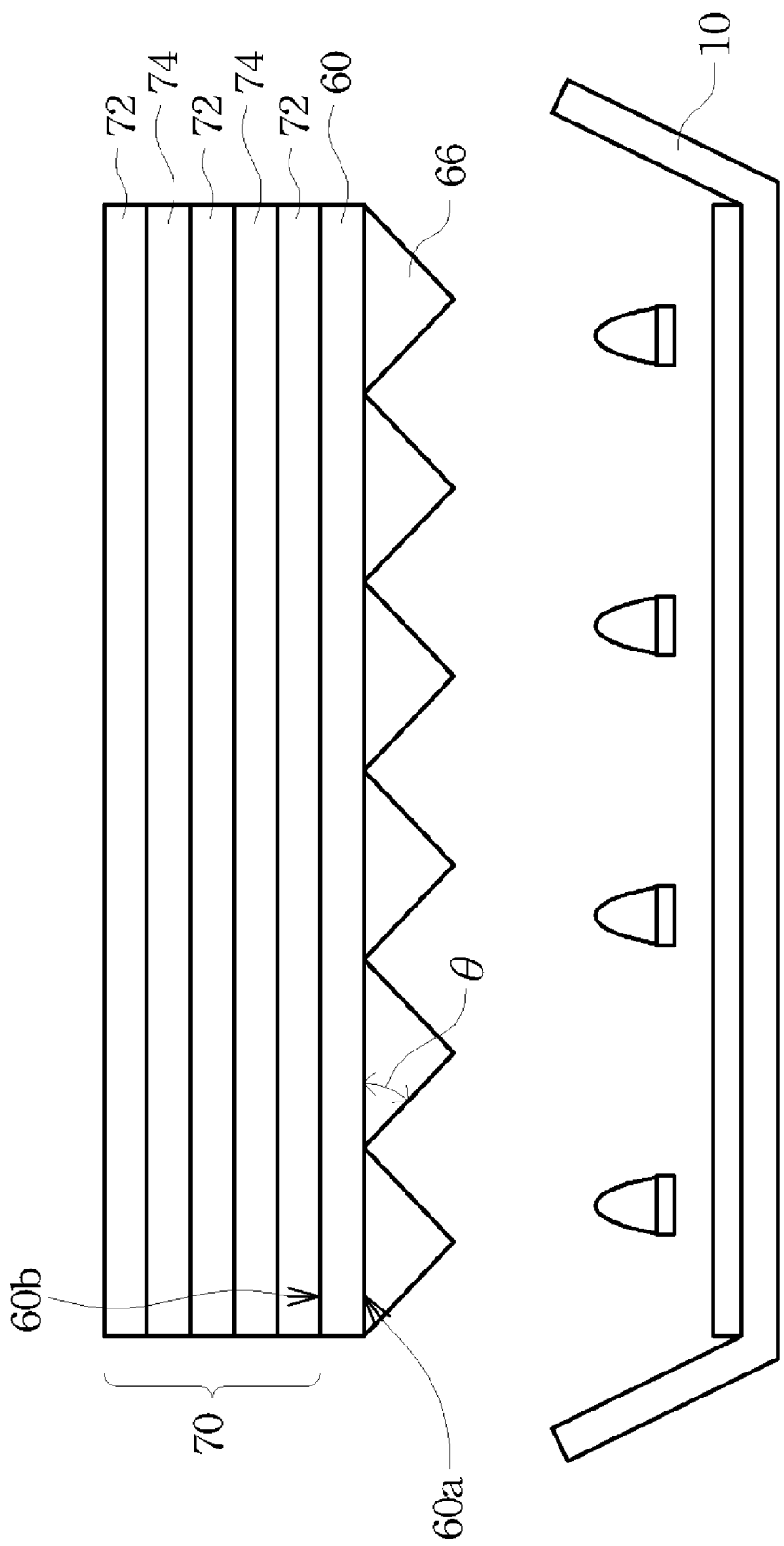
FIG. 5A is a schematic diagram showing the structure of an optical film according to an embodiment of the present invention.

Referring to FIG. 5A, FIG. 5A is a schematic diagram showing the structure of the optical film 40 or 42 (82) according to an embodiment of the present invention. In this embodiment, the optical film 40 or 42 (82) is composed of a substrate 60, a microprism structure 66 and an optical material layer 70. The substrate 60 has a first surface 60a facing towards the reflector base 10 and a second surface 60b opposite to the first surface 60a.

The microprism structure 66 is disposed on the first surface 60a, and the prism height thereof is in a range of about 0.01 mm to about 3 mm and has an incline angle θ in a range of about 10° to about 65° used for controlling the incident angle of the light entering the optical film 40 or 42 (82). The optical material layer 70 is formed on the second surface 60b of the substrate 60 by alternately stacking a plurality of first dielectric layers 72 and a plurality of second dielectric layers 74, wherein the sequence for stacking one first dielectric layer 72 and one second dielectric layer 74 is not limited thereto, and the first dielectric layer 72 has a refractive index greater than the refractive index of the second dielectric layer 74.

The first dielectric layer 72 can be formed from such as MgO, ZnO, $SiN_x$, $SiON_x$, $TiO_2$, ZnSe, ZnS, $TaO_x$, $Al_2O_3$, $TeO_x$, Indium Tin Oxide (ITO) or their mixtures, and the thickness of the first dielectric layer 72 ranges from about 5 nm to about 90 nm.

The second dielectric layer 74 can be formed from such as $Si_2O_3$, $MgF_2$, $SiO_2$, $Al_2O_3$, $TeO_x$, LiF, $SiON_x$ or their mixtures, and the thickness of the second dielectric layer 74 ranges from about 10 nm to about 130 nm.

The optical film 40 or 42 (82) of this embodiment uses the feature of Brewster's angle, which is an incidence angle around which the S-polarized light of the incident light will be reflected and the P-polarized light of the incident light will transmit through, to achieve the object of separating P-polarized light and S-polarized light. The optical film 40 or 42 (82) of this embodiment further adjust the number of two dielectric layers 72 and 74 or the incline angle of the mircoprism structure 66 to control the reflection ratio and transmission ratio of the respective S-polarized and P-polarized light ($S_{1r}/(S_{1r}+S_{1t})$ and $P_{1r}/(P_{1r}+P_{1t})$), and also adjusts the thicknesses of two dielectric layers 72 and 74 with high and low refractive indexes to adjust the polarization band. On the other hand, the reflection ratio of the P-polarized light $P_{1r}/(P_{1r}+P_{1t})$ is also adjusted via the same manner, that is varying the material and/or thickness of the two dielectric layers 72 and 74. Further, the refractive index of the two dielectric layers 72 and 74 can be also altered via this manner.

In an embodiment of adjusting the incline angle θ of the mircoprism structure to control the reflection ratio $P_{1r}/(P_{1r}+P_{1t})$, for example, let say the optical film 40 or 42 (82) consists of the microprism structure 66/the dielectric layer 72/the dielectric layer 74/the dielectric layer 72, wherein the refractive index n of the dielectric layer 72 is 2.0 and the thickness thereof is 57.5 nm; and the refractive index n of the dielectric layer 74 is 1.45 and the thickness thereof is 76.0 nm. As the incline angle θ of the microprism structure 66 is about 45 degree, the reflection ratio $P_{1r}/(P_{1r}+P_{1t})$ is about 6%; and as the incline angle θ of the microprism structure 66 is about 20 degree, the reflection ratio $P_{1r}/(P_{1r}+P_{1t})$ is about 30%.

Figure 5B:
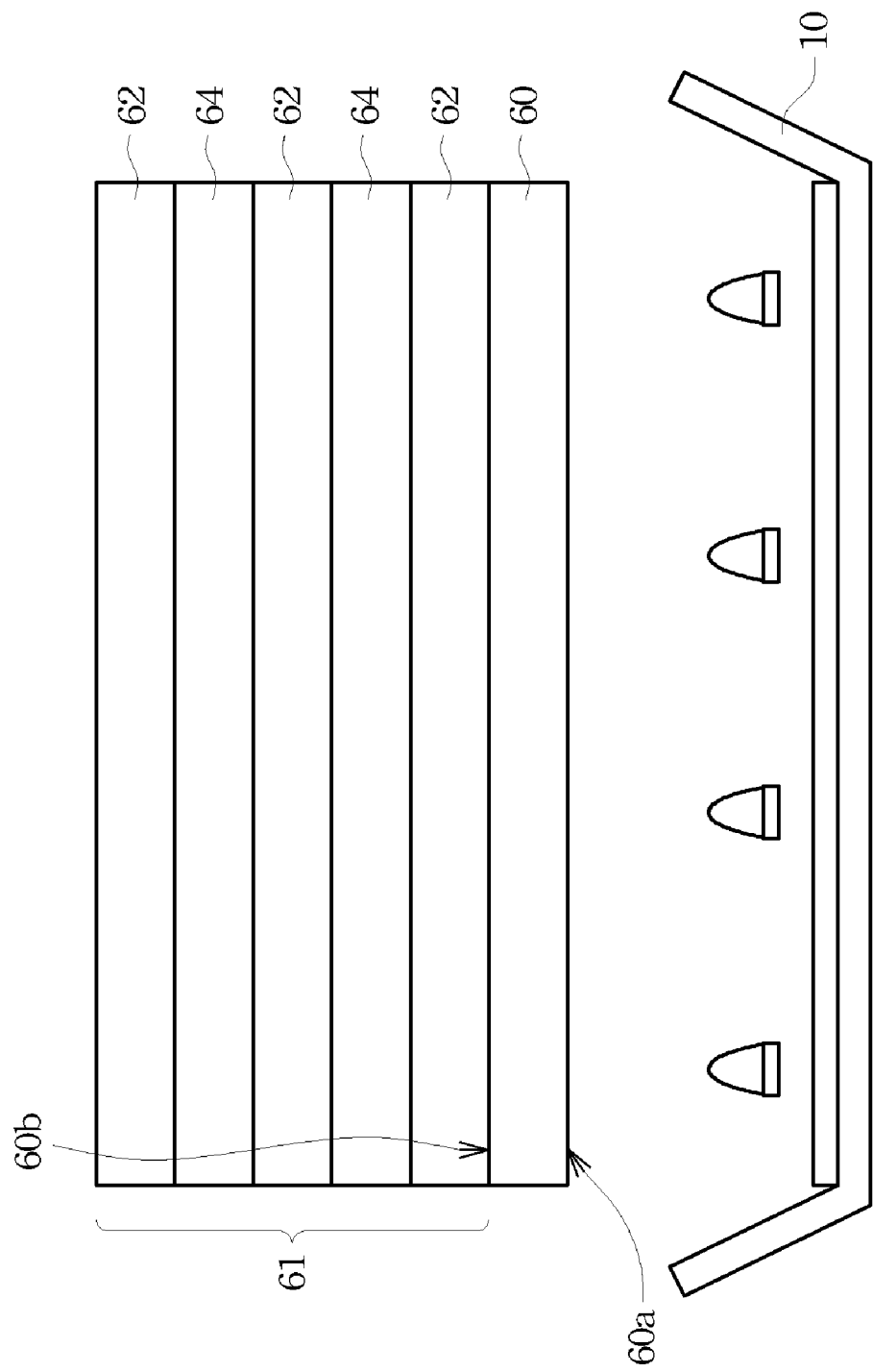
FIG. 5B is a schematic diagram showing the structure of an optical film according to another embodiment of the present invention.

Referring to FIG. 5B, FIG. 5B is a schematic diagram showing the structure of the optical film 40 or 42 (82) according to another embodiment of the present invention. In this embodiment, the optical film 40 or 42 (82) is composed of a substrate 60 and an optical material layer 61. The optical material layer 61 is formed on the second surface 60b of the substrate 60 facing towards the reflector base 10, wherein the optical material layer 61 is formed by alternately stacking a plurality of first material layers 62 and a plurality of second material layers 64, wherein the sequence for stacking one first material layer 62 and one second material layer 64 is not limited thereto, The first material layer 62 is formed from 2,6-polyethylene naphthalate (PEN), and the thickness of the first material 62 ranges from about 10 nm to about 130 nm. The second material layer 64 is formed from co-PEN, and the thickness of the second material layer 64 ranges from about 5 nm to about 110 nm. Since co-PEN is a material of which the refractive index will be changed in a tensile direction due to tensile stress, and the amount of change is varied in accordance with the degree of tensile strain, and thus the refractive index can be changed by adjusting two vertical strains, thereby further adjusting the reflected amounts or ratios of the S-polarized and P-polarized light ($S_{1r}/(S_{1r}+S_{1t})$ and $P_{1r}/(P_{1r}+P_{1t})$). Further, the thicknesses of two optical material layers 62 and 64 also can be adjusted to adjust the polarization band. Therefore, the reflection ratio of the P-polarized light $P_{1r}/(P_{1r}+P_{1t})$ is also adjusted via varying the number or the thickness of the two dielectric layers 62 and 64. Further, the refractive index of the two dielectric layers 62 and 64 can be also altered via this manner.

In an embodiment of adjusting the number of the optical material layers 62 and 64 to control the reflection ratio $P_{1r}/(P_{1r}+P_{1t})$, for example, assuming x-direction for S-Polarized light and y-direction for P-Polarized light, the first material 62 is formed from PEN with 61 nm in thickness, and the second material 64 is formed from co-PEN with 70 nm in thickness, wherein the refractive index of co-PEN in y-direction is about 1.64, and the refractive index of PEN in y-direction is about 1.88. As the optical film 40 or 42 (82) consists of the substrate 60/the first material 62/the second material 64/the first material 62/the second material 64/the first material 62/the second material 64/the first material 62 (seven layers)/air, the $P_{1r}/(P_{1r}+P_{1t})$ is 60%; and as the optical film 40 or 42 (82) consists of the substrate 60/the first material 62/the second material 64/the first material 62 (three layers)/air, the $P_{1r}/(P_{1r}+P_{1t})$ is 40%.

It can be known from the above embodiments of the present invention, the application of the present invention has the advantages of increasing the photon utilization of backlight source, thus promoting the entire lightness of the LCD.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising:
   a reflector base;
   a phosphor layer disposed on the reflector base;
   a plurality of light emitting diode (LED) packages disposed above the reflector base and the phosphor layer for emitting a first light beam, each of the LED packages comprising a blue LED, wherein the phosphor layer is outside the LED packages; and
   an optical film disposed above the reflector base, the phosphor layer and the LED packages for allowing P-polarized light of the first light beam to pass through the optical film and reflecting S-polarized light of the first light beam;
   wherein the phosphor layer is excited by the first light beam to generate a second light beam, and the second light beam have different wavelengths from the first light beam so as to mix with the first light beam to generate white light.

2. The backlight module as claimed in claim 1, wherein the phosphor layer is a yellow phosphor layer.

3. The backlight module as claimed in claim 2, wherein the S-polarized light has wavelengths ranging from 420 nm to 500 nm.

4. The backlight module as claimed in claim 1, wherein the strongest wavelength range of the first light beam is from 440 nm to 490 nm.

5. The backlight module as claimed in claim 1, wherein the first light beam comprises light with wavelengths ranging from 420 nm to 500 nm.

6. The backlight module as claimed in claim 1, wherein each of the LED packages further comprises a green LED, and the phosphor layer is a red phosphor layer.

7. The backlight module as claimed in claim 6, wherein the S-polarized light has wavelengths ranging from 420 nm to 580 nm.

8. The backlight module as claimed in claim 1, wherein each of the LED packages further comprises green phosphor, and the phosphor layer on the reflector base is a red phosphor layer.

9. The backlight module as claimed in claim 8, wherein the S-polarized light has wavelengths ranging from 420 nm to 580 nm.

10. The backlight module as claimed in claim 1, wherein the phosphor layer comprises a red phosphor material and a green phosphor material.

11. The backlight module as claimed in claim 10, wherein the S-polarized light has wavelengths ranging from 420 nm to 500 nm.

12. The backlight module as claimed in claim 1, wherein the optical film comprise:
    a substrate having a first surface facing towards the reflector base, and a second surface opposite to the first surface;
    a microprism structure disposed on the first surface; and
    an optical material layer formed on the second surface, wherein the optical material layer is formed by alternately stacking at least one first dielectric layer and at least one second dielectric layer, and the first dielectric layer has a refractive index greater than the refractive index of the second dielectric layer.

13. The backlight module as claimed in claim 12, wherein the first dielectric layer is formed from a material selected from the group consisting of MgO, ZnO, $SiN_x$, $SiON_x$, $TiO_2$, ZnSe, ZnS, $TaO_x$, $Al_2O_3$, $TeO_x$, Indium Tin Oxide (ITO) and their mixtures, and the second dielectric layer is formed from a material selected from the group consisting of $Si_2O_3$, $MgF_2$, $SiO_2$, $Al_2O_3$, $TeO_x$, LiF, $SiON_x$ and their mixtures.

14. The backlight module as claimed in claim 12, wherein the thickness of the first dielectric layer ranges from 5 nm to 90 nm, and the thickness of the second dielectric layer ranges from 10 nm to 130 nm.

15. The backlight module as claimed in claim 1, wherein the optical film comprises:
    a substrate; and
    an optical material layer formed on a surface of the substrate facing towards the reflector base, wherein the optical material layer is formed by alternately stacking at least one first material layer and at least one second material layer, and the first material layer is formed from 2,6-polyethylene naphthalate (PEN), and the second material layer is formed from co-PEN.

16. The backlight module as claimed in claim 15, wherein the thickness of the first material layer ranges from 10 nm to 130 nm, and the thickness of the second material layer ranges from 5 nm to 110 nm.

17. The backlight module as claimed in claim 1, wherein the optical film is a double brightness enhancement film (DBEF).

18. The backlight module as claimed in claim 1 wherein all of the LED packages face towards the optical film.

19. The backlight module as claimed in claim 1, wherein a portion of the LED packages face towards the optical film, and the other portion of the LED packages face towards the phosphor layer.

20. The backlight module as claimed in claim 19, wherein the ratio of the number of the first portion of the LED packages to the number of the second portion of the LED packages is about 2:1 to about 99:1.

21. The backlight module as claimed in claim 1, wherein the LED packages are spaced from the phosphor layer at a distance, and the distance ranges from 0.01 mm to 3 mm.

22. A liquid crystal display, comprising:
a backlight module as claimed in claim 1;
a polarizer disposed on a light emitting direction of the backlight module; and
a liquid crystal panel disposed above the polarizer.

23. A backlight module, comprising:
a reflector base;
a phosphor layer disposed on the reflector base;
a plurality of LED packages disposed above the reflector base and the phosphor layer for emitting a first light beam, each of the LED packages comprising a blue LED, wherein the phosphor layer is outside the LED packages; and
an optical film disposed above the reflector base, the phosphor layer and the LED packages, the optical film comprising:
a substrate having a first surface facing towards the reflector base, and a second surface opposite to the first surface;
a microprism structure disposed on the first surface; and
an optical material layer formed on the second surface, wherein the optical material layer is formed by alternately stacking at least one first dielectric layer and at least one second dielectric layer;
wherein the first dielectric layer is formed from a material selected from the group consisting of MgO, ZnO, $SiN_x$, $SiON_x$, $TiO_2$, ZnSe, ZnS, $TaO_x$, $Al_2O_3$, $TeO_x$, Indium Tin Oxide (ITO) and their mixtures, and the second dielectric layer is formed from a material selected from the group consisting of $Si_2O_3$, $MgF_2$, $SiO_2$, $Al_2O_3$, $TeO_x$, LiF, $SiON_x$ and their mixtures; and
wherein the thickness of the first dielectric layer ranges from 5 nm to 90 nm, and the thickness of the second dielectric layer ranges from 10 nm to 130 nm.

24. A liquid crystal display, comprising:
a backlight module as claimed in claim 23;
a polarizer disposed on a light emitting direction of the backlight module; and
a liquid crystal panel disposed above the polarizer.

25. A backlight module, comprising:
a reflector base;
a phosphor layer disposed on the reflector base;
a plurality of LED packages disposed above the reflector base and the phosphor layer for emitting a first light beam, each of the LED packages comprising a blue LED, wherein the phosphor layer is outside the LED packages;
an optical film disposed above the reflector base, the phosphor layer and the LED packages, the optical film comprising:
a substrate having a first surface facing towards the reflector base, and a second surface opposite to the first surface; and
an optical material layer formed on a surface of the substrate facing towards the reflector base, wherein the optical material layer is formed by alternately stacking at least one first material layer and at least one second material layer;
wherein the first material layer is formed from 2,6-polyethylene naphthalate (PEN), and the second material layer is formed from co-PEN; and
wherein the thickness of the first material layer ranges from 10 nm to 130 nm, and the thickness of the second material layer ranges from 5 nm to 110 nm.

26. A liquid crystal display, comprising:
a backlight module as claimed in claim 25;
a polarizer disposed on a light emitting direction of the backlight module; and
a liquid crystal panel disposed above the polarizer.

* * * * *